US008565465B2

(12) United States Patent
Inoda et al.

(10) Patent No.: US 8,565,465 B2
(45) Date of Patent: Oct. 22, 2013

(54) MICROPHONE UNIT AND MOBILE PHONE PROVIDED WITH THE SAME

(75) Inventors: Takeshi Inoda, Daito (JP); Ryusuke Horibe, Daito (JP); Fuminori Tanaka, Daito (JP); Rikuo Takano, Daito (JP); Kiyoshi Sugiyama, Mitaka (JP); Toshimi Fukuoka, Yokohama (JP); Masatoshi Ono, Tsukuba (JP)

(73) Assignees: Funai Electric Co., Ltd., Daito-shi (JP); Funai Electric Advanced Applied Technology Research Institute Inc., Daito-shi (JP)

( * ) Notice: Subject to any disclaimer, the term of this patent is extended or adjusted under 35 U.S.C. 154(b) by 116 days.

(21) Appl. No.: 13/056,513

(22) PCT Filed: Jul. 16, 2009

(86) PCT No.: PCT/JP2009/062904
§ 371 (c)(1),
(2), (4) Date: Mar. 15, 2011

(87) PCT Pub. No.: WO2010/013603
PCT Pub. Date: Feb. 4, 2010

(65) Prior Publication Data
US 2011/0195745 A1 Aug. 11, 2011

(30) Foreign Application Priority Data
Jul. 30, 2008 (JP) ................. 2008-196540

(51) Int. Cl.
*H04R 25/00* (2006.01)
(52) U.S. Cl.
USPC ............................ 381/361; 381/355; 381/365

(58) Field of Classification Search
USPC .................. 381/355–358, 361, 365, 369, 182
See application file for complete search history.

(56) References Cited

U.S. PATENT DOCUMENTS

| 5,511,130 | A | 4/1996 | Bartlett et al. |
| 6,633,647 | B1 * | 10/2003 | Markow et al. ............... 381/356 |
| 2005/0069164 | A1 | 3/2005 | Muthuswamy et al. |
| 2005/0207605 | A1 | 9/2005 | Dehe et al. |
| 2008/0130935 | A1 | 6/2008 | Sato et al. |

FOREIGN PATENT DOCUMENTS

| CN | 1114479 A | 1/1996 |
| EP | 1 505 853 A2 | 2/2005 |
| JP | 6-339192 A | 12/1994 |
| JP | 7-307990 A | 11/1995 |
| JP | 8-98289 A | 4/1996 |
| JP | 2001-54195 A | 2/2001 |
| JP | 2003-163996 A | 6/2003 |
| JP | 2005-295278 A | 10/2005 |
| JP | 2007-60228 A | 3/2007 |
| JP | 2008-109649 A | 5/2008 |

OTHER PUBLICATIONS

International Search Report dated Oct. 27, 2009 (two (2) pages).
Extended European Search Report dated Feb. 13, 2013 (seven (7) pages).

* cited by examiner

*Primary Examiner* — Suhan Ni
(74) *Attorney, Agent, or Firm* — Crowell & Moring LLP

(57) ABSTRACT

Provided is a microphone unit having flat frequency characteristics. A microphone unit includes a casing, a first substrate, a second substrate, a vibrating unit, a diaphragm, an ASIC, and a dummy component. The dummy component is attached to the substrate to be located below an opening.

12 Claims, 6 Drawing Sheets

MICROPHONE UNIT AND MOBILE PHONE PROVIDED WITH THE SAME

TECHNICAL FIELD

The present invention relates to a microphone unit, and particularly to improvement in acoustic characteristics of a microphone unit.

BACKGROUND ART

During a conversation over the phone or the like, sound recognition, sound recording, and the like, it is preferable to collect only a target sound (a speaker's voice). However, in an environment in which a sound input device for sound collection is used, a sound other than the target sound, such as a background noise, may exist. Thus, sound input devices having a function that allows a target sound to be accurately extracted even when the devices are used in an environment in which a noise exists, that is, a function of removing a noise, are under development. In addition, recently, electronic equipment has been downsized, and the sound input devices have also been downsized.

Concerning the sound input devices (hereinafter also referred to as "microphones"), for example, Japanese Patent Laying-Open No. 06-339192 (Patent Document 1) discloses a microphone unit for "allowing variations in individual acoustic impedance characteristics to be readily adjusted to a predetermined characteristic in an omnidirectional electric capacitor microphone" ([Object] in [Abstract]). The microphone unit is described as "In a microphone unit 1 in which a diaphragm 5, a back plate 6, a cover plate 9, and the like are housed in a unit case 2, a path 12 connecting a rear portion of back plate 6 with an outside is formed, and path 12 is provided with an adjustment mechanism changing an acoustic impedance of path 12. As an example of the adjustment mechanism, path 12 is provided to cover plate 9, and a bolt 14 is screwed into path 12. The acoustic impedance of path 12 is changed by changing the degree with which bolt 14 is screwed" ([Means for Solution] in [Abstract]).

In addition, Japanese Patent Laying-Open No. 08-098289 (Patent Document 2) discloses a "ground-based microphone having flat sensitivity frequency characteristics by improving sensitivity frequency characteristics in a high frequency range" ([Object] in [Abstract]). The ground-based microphone is described as "In a container 1a of a microphone element 1, an extremely small pressure equivalent sound hole 1b connecting an inside and an outside of container 1a inside a diaphragm 1c is provided" ([Means for Solution] in [Abstract]).

Japanese Patent Laying-Open No. 2007-060228 (Patent Document 3) discloses a silicon microphone package "having a cavity and a vent hole (leak hole) that allow the package to obtain excellent sound receiving characteristics, and capable of being fabricated at a low cost" ([Object] in [Abstract]). It is described that "A silicon microphone package 1 includes a printed circuit board 4 in which a silicon microphone chip 2 is mounted over an opening 4a, a casing 5 placed on printed circuit board 4 to surround silicon microphone chip 2, and an insulating plate 6 placed on a rear surface of casing 5. In the rear surface of casing 5, a groove 5a and an opening 5b toward which groove 5a faces are provided. Insulating plate 6 is provided with a through hole 6a. By placing casing 5 on printed circuit board 4, a space surrounded by casing 5 and printed circuit board 4 serves as a cavity 7, and by placing insulating plate 6 on the rear surface of casing 5, through hole 6a, groove 5a, and opening 5b serve as a vent hole 8 connecting cavity 7 with an external space" ([Means for Solution] in [Abstract]).

Japanese Patent Laying-Open No. 2001-054195 (Patent Document 4) discloses an "electret capacitor microphone having a small size and less number of components that prevents an adverse effect due to a reflected wave during vibration" ([Object] in [Abstract]). The electret capacitor microphone is described as "In an electret capacitor microphone in which a fixed electrode 6 and a vibrating membrane 4 are arranged at a certain interval to detect a sound signal given to vibrating membrane 4 based on a change in capacitance therebetween, fixed electrode 6, vibrating membrane 4, and a semiconductor element 8 are housed in a concave portion 9a of a box-shaped case 9 made of an insulating material, and a rear chamber 12 is provided in a wall surface of concave portion 9a" ([Means for Solution] in [Abstract]).

Japanese Patent Laying-Open No. 2003-163996 (Patent Document 5) discloses an "electret capacitor microphone having a small size and less number of components that prevents an adverse effect due to a reflected wave during vibration" ([Problem] in [Abstract]). The electret capacitor microphone is described as "In an electret capacitor microphone in which a fixed electrode 6 and a vibrating membrane 4 are arranged at a certain interval to detect a sound signal given to vibrating membrane 4 based on a change in capacitance therebetween, fixed electrode 6, vibrating membrane 4, and a semiconductor element 8 are housed in a concave portion 9a of a box-shaped case 9 made of an insulating material, and a rear chamber 12 is provided in a wall surface of concave portion 9a" ([Means for Solution] in [Abstract]).

PRIOR ART DOCUMENTS

Patent Documents

Patent Document 1: Japanese Patent Laying-Open No. 06-339192
Patent Document 2: Japanese Patent Laying-Open No. 08-098289
Patent Document 3: Japanese Patent Laying-Open No. 2007-060228
Patent Document 4: Japanese Patent Laying-Open No. 2001-054195
Patent Document 5: Japanese Patent Laying-Open No. 2003-163996

SUMMARY OF THE INVENTION

Problems to be Solved by the Invention

Generally, a microphone unit includes a casing portion including an internal space, a diaphragm arranged inside the internal space to convert acoustic vibration into an electric signal, an amplifier portion amplifying and outputting the electric signal, and an opening provided in the casing portion to connect the internal space with an external space.

In the microphone unit having such a configuration, the diaphragm is not arranged immediately below the opening, and is arranged to be offset such that the diaphragm does not overlap with a portion immediately below the opening (a portion inside the casing), in order to avoid a malfunction caused by dust entering from the opening from which a sound is input and adhering onto the diaphragm. If the diaphragm is arranged immediately below the opening, the length of a path from the opening to the diaphragm, that is, a propagation time, is minimum, and the volume of the internal space can be minimized. However, if the diaphragm is arranged to be offset from the opening, a certain length of the path and a certain volume of the internal space exist in a portion from the opening to the diaphragm. The internal space configures a system that resonates acoustically. A resonance frequency fo in the space is determined depending on the length of the path from the opening to the diaphragm, the volume and shape of the internal space, and the like.

In order to keep frequency characteristics of a microphone flat up to a high range, it is desirable to set the resonance frequency in the internal space to a high value. For that purpose, it is necessary to design the internal space to have a volume as small as possible. However, the diaphragm has a support portion supporting the periphery to maintain its strength, with a certain thickness (for example, about 0.4 mm). Thus, for example, if an opening is provided in an upper portion of a box-shaped casing, and the diaphragm is arranged on a bottom portion of an internal space of the casing to be offset from the opening, the internal space at least requires a thickness as the sum of the thickness of the support portion and a thickness of an acoustic path for transmitting a sound input from the opening to the diaphragm (for example, about 0.3 mm). Therefore, a useless space exists below the opening, beside the diaphragm and the support portion. A thickness of 0.3 mm is sufficient for acoustic transmission, while a thickness of 0.7 mm below the opening is useless, increases the volume of the internal space, and leads to a reduction in resonance frequency fo, thus narrowing a flat frequency band and deteriorating the frequency characteristics of the microphone.

Consequently, a microphone unit with a small size and improved acoustic characteristics is needed. In another aspect, a microphone unit having more flat frequency characteristics is needed. In another aspect, a mobile phone with a small size and improved acoustic characteristics is needed.

Means for Solving the Problems

A microphone unit according to an embodiment includes: a casing having an internal space and an opening; a vibrating portion arranged in the internal space to convert acoustic vibration into an electric signal; and an acoustic correction member arranged inside the internal space to correct characteristics of acoustic transmission from the opening to the diaphragm.

Preferably, the internal space includes a first partial space and a second partial space. The vibrating portion is arranged between the first partial space and the second partial space. A second opening connected to the second partial space is further formed in the casing portion. The acoustic correction member is placed in at least one of the first partial space and the second partial space.

Preferably, the acoustic correction member is formed such that an air volume of the first partial space is equal to an air volume of the second partial space.

Preferably, the acoustic correction member has a shape formed such that an acoustic impedance from the first opening to the vibrating portion is equal to an acoustic impedance from the second opening to the vibrating portion.

Preferably, the vibrating portion is arranged to be offset from a central axis of the opening.

Preferably, the acoustic correction member is arranged below the opening. Preferably, the acoustic correction member is an insulator.

Preferably, the acoustic correction member is formed of a conductive material and fixed to a ground potential.

Preferably, the acoustic correction member is fitted in the casing.

Preferably, the microphone unit further includes a substrate. The acoustic correction member is solder-bonded to the substrate.

According to another embodiment, a mobile phone provided with any of the microphone units described above is provided.

With a microphone unit according to an embodiment, more flat frequency characteristics are achieved, and acoustic characteristics are improved. According to another embodiment, a mobile phone in which more flat frequency characteristics are achieved and acoustic characteristics are improved is provided.

The foregoing and other objects, features, aspects and advantages of the present invention will become apparent from the following detailed description of the present invention when taken in conjunction with the accompanying drawings.

MODES FOR CARRYING OUT THE INVENTION

Figure 1:
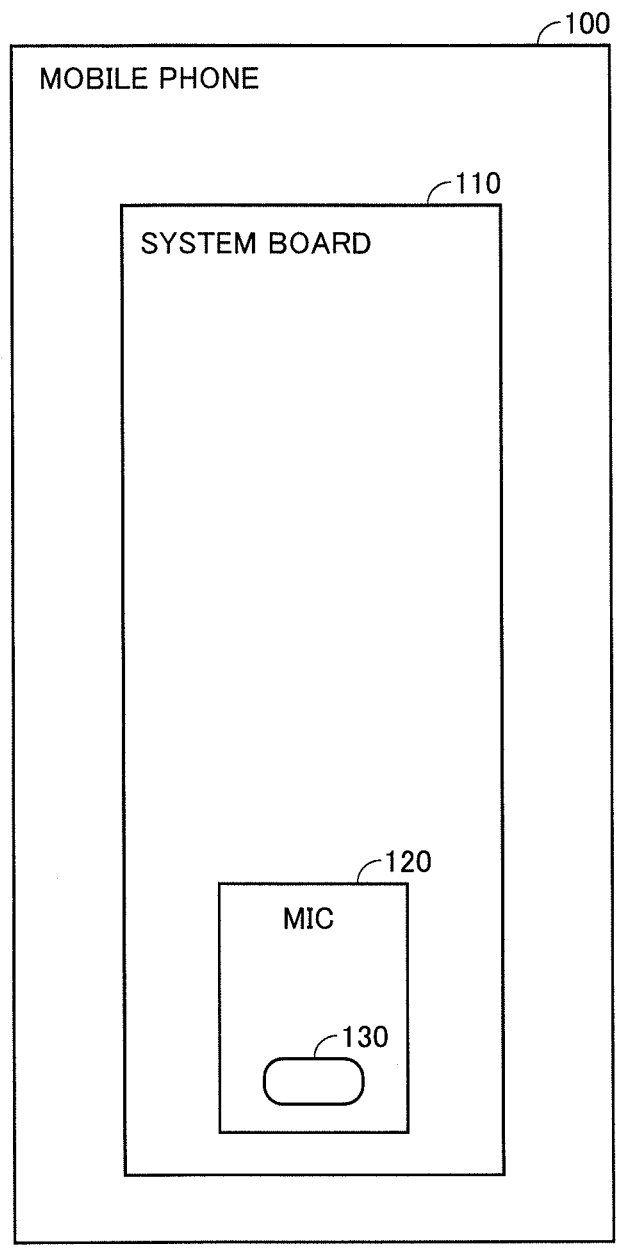
FIG. 1 is a schematic view of a configuration of a mobile phone 100 using a microphone unit 120 in accordance with a first embodiment.

Hereinafter, embodiments of the present invention will be described with reference to the drawings. In the description below, identical parts will be designated by the same reference numerals. Since their names and functions are also the same, the detailed description thereof will not be repeated.

<First Embodiment>

Referring to FIG. 1, a mode of use of a microphone unit in accordance with a first embodiment will be described. FIG. 1 is a schematic view of a configuration of a mobile phone 100 using a microphone unit 120. Mobile phone 100 includes a system board 110. System board 110 includes microphone unit 120. Microphone unit 120 includes an opening 130. System board 110 is mounted with a circuit element for implementing an operation of mobile phone 100.

Figure 2:
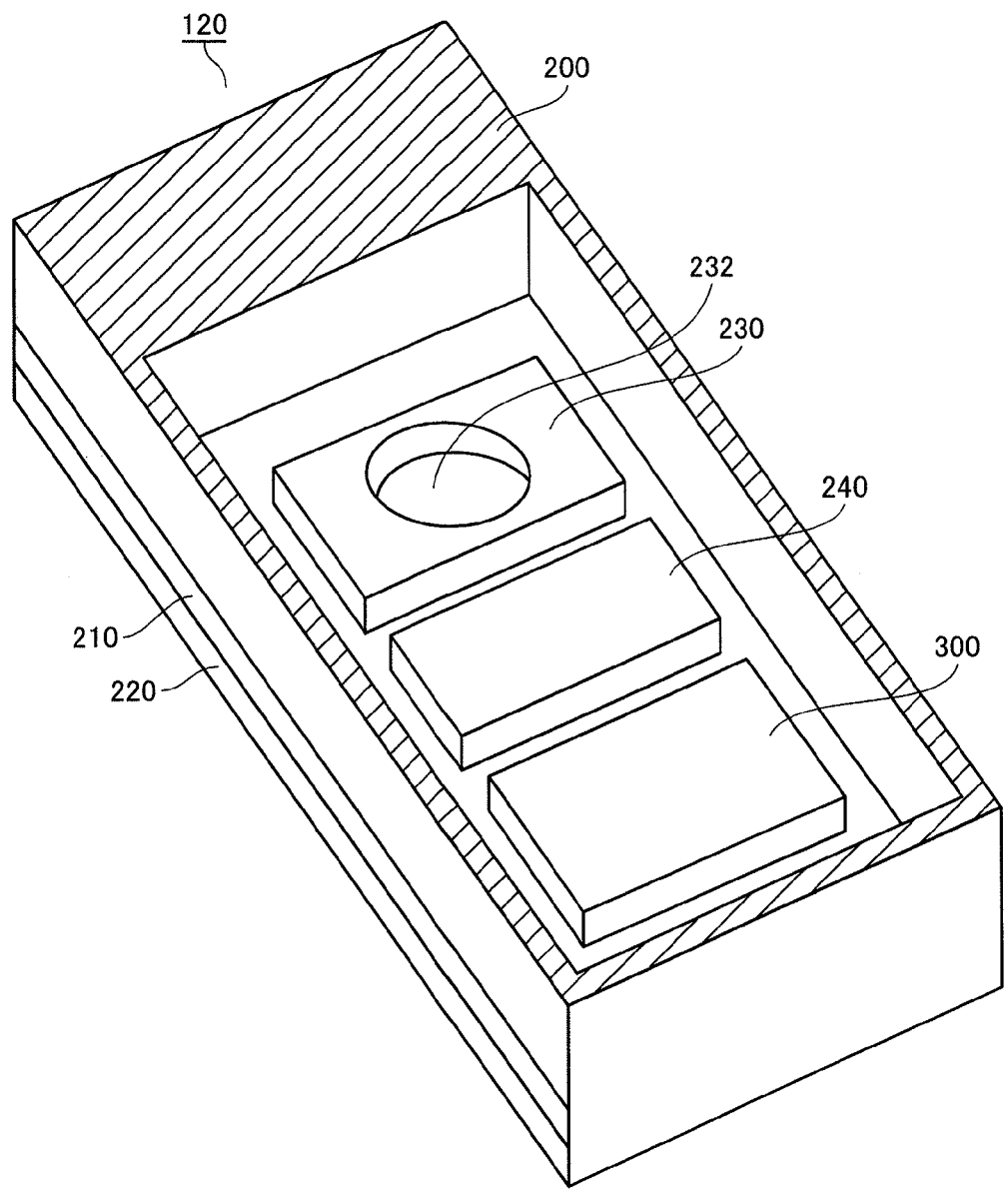
FIG. 2 is a view showing a state where an upper portion of a casing 200 of microphone unit 120 is cut along a plane parallel to a system board 110.

Referring to FIG. 2, a configuration of microphone unit 120 in accordance with the first embodiment will be described. FIG. 2 is a view showing a state where an upper portion of a casing 200 of microphone unit 120 is cut along a plane parallel to system board 110. Microphone unit 120 includes casing 200, a first substrate 210, a second substrate 220, a vibrating unit 230, an ASIC (Application Specific Integrated Circuit) 240, and a dummy component 300. Vibrating unit 230 includes a diaphragm 232. Although microphone unit 120 in accordance with the present embodiment is, for example, a capacitor microphone, it may be a microphone of another type. The first substrate 210 and the second substrate 220 may be configured as a single-piece substrate.

Diaphragm 232 has a configuration in which, for example, acoustic-electric conversion is performed by a piezoelectric effect using an inorganic piezoelectric thin film or an organic piezoelectric thin film, or a configuration using an electret film. However, diaphragm 232 is not limited to these configurations. A microphone substrate configured of the first substrate 210 and the second substrate 220 is made of, for example, a material such as an insulating molding base material, fired ceramics, glass epoxy, and plastic. However, an insulating material other than those may be used.

Diaphragm 232 vibrates in an normal direction in response to entry of an acoustic wave. Vibrating unit 230 outputs an electric signal in accordance with a sound entering diaphragm 232. Diaphragm 232 can be a diaphragm of microphones of various types such as electrodynamic (dynamic), electromagnetic (magnetic), and piezoelectric (crystal) microphones.

Alternatively, diaphragm 232 may be a diaphragm of a semiconductor film (for example, a silicon film) or a silicon microphone (Si microphone). By using a silicon microphone, microphone unit 120 can be downsized and can have higher performance.

It should be noted that the shape of diaphragm 232 is not particularly limited. For example, the outer shape of diaphragm 232 may be circular, elliptical, polygonal, or the like.

Dummy component 300 corrects acoustic transmission characteristics in an internal space of casing 200. For example, by reducing the volume of the internal space when compared with a case where dummy component 300 is not provided to casing 200, dummy component 300 shifts a resonance frequency in the internal space to a high range. Thereby, a band having flat frequency characteristics is widened, and acoustic characteristics can be improved.

Figure 3:
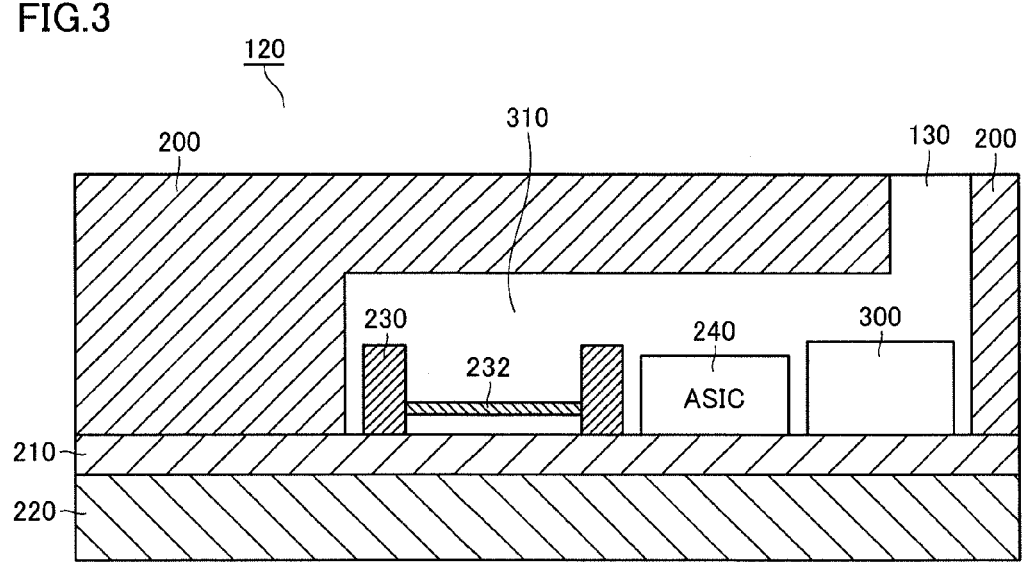
FIG. 3 is a view showing a state where microphone unit 120 is cut along a plane perpendicular to system board 110.

Referring to FIG. 3, the configuration of microphone unit 120 will further be described. FIG. 3 is a view showing a state where microphone unit 120 is cut along a plane perpendicular to system board 110. Casing 200 is configured to surround vibrating unit 230, diaphragm 232, ASIC 240, and dummy component 300. Dummy component 300 is attached to the first substrate 210 to be located below opening 130. Diaphragm 232 is arranged to be offset from opening 130. With such an arrangement, even if microscopic objects such as dust enter from opening 130, they are less likely to reach diaphragm 232, and thus they are less likely to affect the vibration of diaphragm 232.

In an aspect, dummy component 300 is made of, for example, resin or an insulator other than that. In another aspect, dummy component 300 can be fixed to a ground potential through the first substrate 210. In this case, dummy component 300 may be made of a conductive material. Thereby, the effect of electromagnetic shield can be enhanced.

Dummy component 300 is fitted in a wall surface of casing 200, or in the first substrate 210. With the fit-in structure, dummy component 300 can be accurately positioned relative to the casing. In another aspect, dummy component 300 may be solder-bonded to the first substrate 210.

An internal space 310 is formed inside microphone unit 120, that is, inside casing 200. Internal space 310 is primarily formed by the presence of a misalignment (offset) between vibrating unit 230 and opening 130.

The first substrate 210 constituting internal space 310 is manufactured, for example, by pressing a mold having a convex portion onto an insulating molding base material, or with fired ceramics using a desired mold. Further, in another aspect, the first substrate 210 can also be manufactured by laminating a substrate having a through hole and a substrate not having a through hole, in plural.

Figure 4:
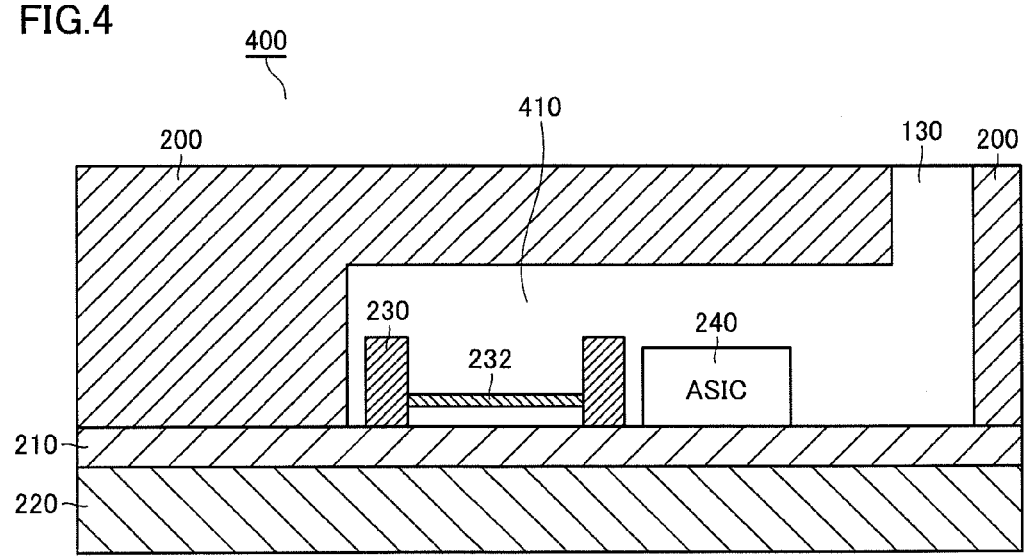
FIG. 4 is a schematic view of a configuration of a microphone unit 400 not having a dummy component 300.

Next, referring to FIG. 4, a microphone unit 400 in accordance with another aspect will be described. FIG. 4 is a schematic view of a configuration of microphone unit 400 not having dummy component 300. Microphone unit 400 includes casing 200, the first substrate 210, the second substrate 220, vibrating unit 230, diaphragm 232, and ASIC 240. A dummy component is not included in microphone unit 400.

In microphone unit 400 having the configuration shown in FIG. 4, a sound provided from opening 130 resonates inside casing 200. In that case, since an internal space 410 of casing 200 has a larger volume, its resonance frequency is lower than the resonance frequency in the case where casing 200 has a small internal space.

Figure 5:
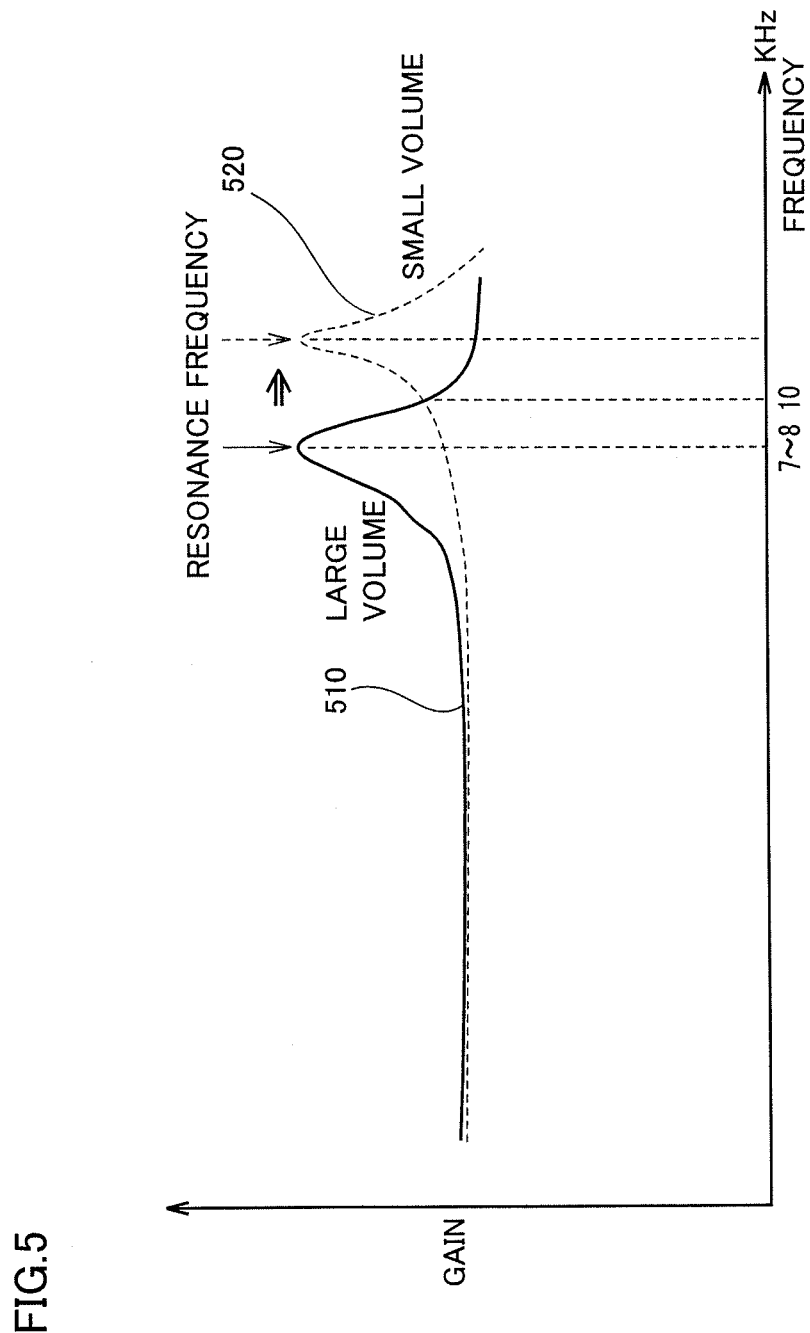
FIG. 5 is a view showing frequency characteristics of a resonance frequency in a case where an internal space of casing 200 has a large volume and frequency characteristics thereof in a case where the internal space has a small volume.

Thus, referring to FIG. 5, the relationship between the volume inside casing 200 and the resonance frequency will be described. FIG. 5 is a view showing the resonance frequency in each of cases where the volume inside casing 200 is large and where the volume inside casing 200 is small.

A graph 510 corresponds, for example, to characteristics of the resonance frequency in the case of microphone unit 400 shown in FIG. 4. A graph 520 corresponds to characteristics of the resonance frequency in the case of microphone unit 120 in accordance with the present embodiment.

Internal space 410 of microphone unit 400 is larger than internal space 310 of microphone unit 120, at least by the volume of dummy component 300. As a result, the resonance frequency in microphone unit 400 is lower than the resonance frequency in microphone unit 120. However, when dummy component 300 is attached to the inside of casing 200 as shown in FIG. 3, internal space 310 has a volume smaller than the volume of internal space 410. As a result, the frequency characteristics shown as indicated by graph 510 change as indicated by graph 520. That is, the resonance frequency becomes higher, and flat frequency characteristics extend to a high range. As a result, acoustic characteristics of mobile phone 100 using microphone unit 120 in accordance with the present embodiment are improved.

FIG. 5 illustrates that an intersection point of graphs 510 and 520 has a frequency of 10 KHz, and that the resonance frequency in graph 510 has a value of 7 to 8 KHz. These values are merely by way of example, and each value may vary depending on the configuration of the microphone unit.

<Second Embodiment>

Hereinafter, a second embodiment will be described. A microphone unit 600 in accordance with the present embodiment is different from microphone unit 120 in accordance with the first embodiment described above in that microphone unit 600 is a so-called differential microphone.

Figure 6:
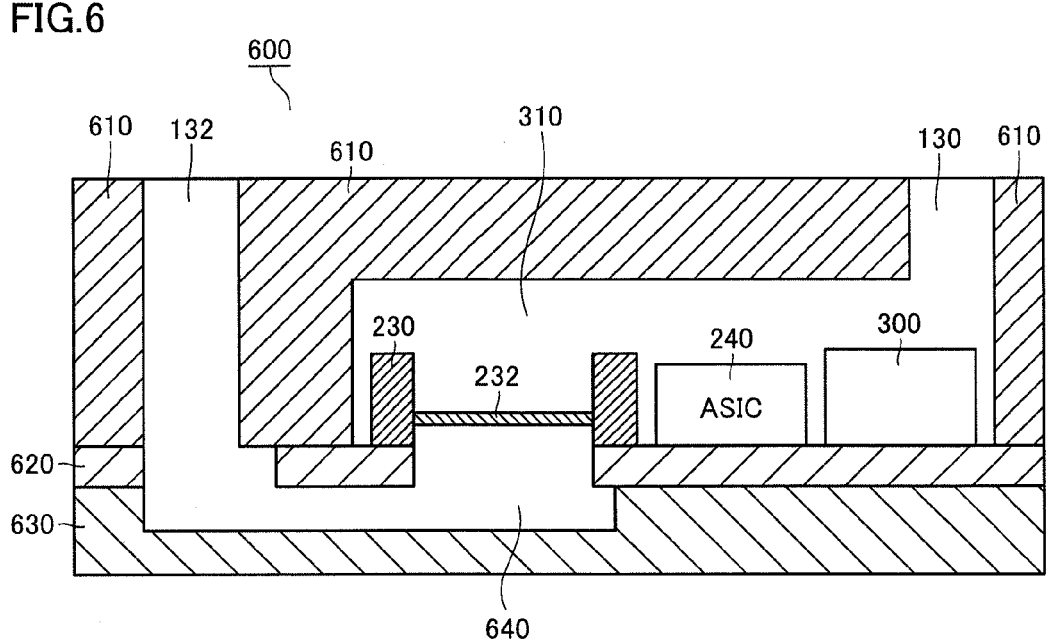
FIG. 6 is a schematic view of a cross sectional structure of a microphone unit 600 in accordance with a second embodiment.

Referring to FIG. 6, a configuration of microphone unit 600 in accordance with the present embodiment will be described. FIG. 6 is a schematic view of a cross sectional structure of microphone unit 600. Microphone unit 600 includes a casing 610, a first substrate 620, a second substrate 630, vibrating unit 230, diaphragm 232, ASIC 240, and dummy component 300. Openings 130, 132 are provided in a front surface of casing 610. A sound passing through opening 130 propagates through a portion above dummy component 300 and ASIC 240 (that is, "internal space 310"), and vibrates an upper surface of diaphragm 232. On the other hand, a sound entering from opening 132 passes through an opening provided in the first substrate 620, then through a transmission path provided between the first substrate 620 and the second substrate 630 (that is, an internal space 640), and vibrates a rear surface of diaphragm 232.

Preferably, in the example shown in FIG. 6, internal space 310 of microphone unit 600 has a volume substantially identical to the volume of internal space 640. In addition, a distance from opening 130 to diaphragm 232 and a distance from opening 132 to diaphragm 232, that is, respective propagation times, are identical. In this case, a noise propagating through internal space 310 cancels a noise propagating through internal space 640, and thus diaphragm 232 vibrates with the noises being cancelled. As a result, higher-quality acoustic characteristics can be obtained.

Here, it is desirable that, in a frequency band in use, frequency characteristics from opening 130 to diaphragm 232 are balanced and matched with frequency characteristics from opening 132 to diaphragm 232, because, if they are not balanced, characteristics as a differential microphone, for example, the effect of suppressing a distant noise, are deteriorated.

Figure 7:
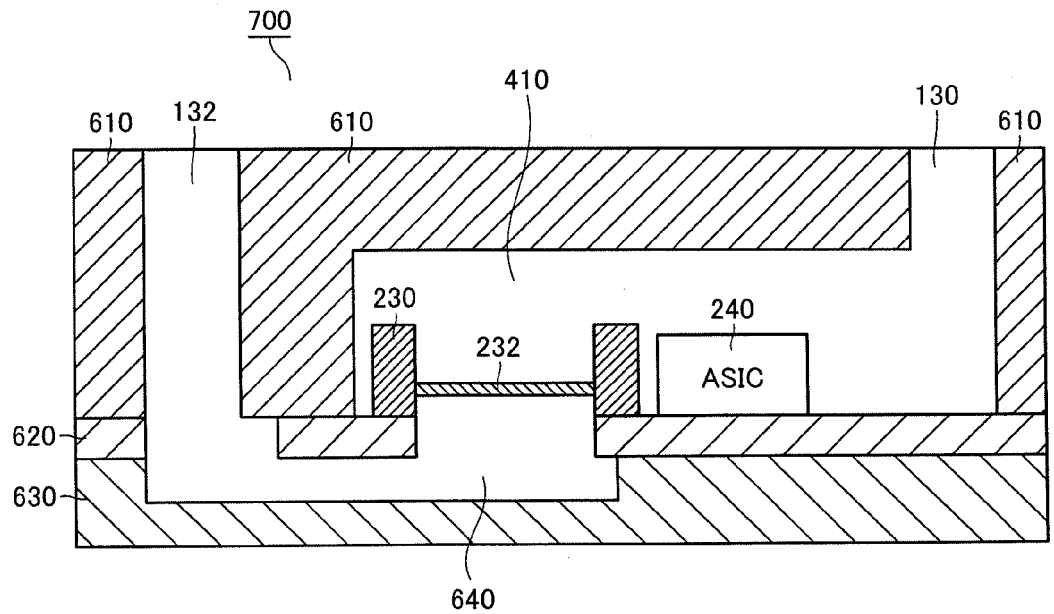
FIG. 7 is a schematic view of a configuration of a microphone unit 700 not having a dummy component.

Referring to FIG. 7, a microphone unit 700 in accordance with another aspect will be described. FIG. 7 is a schematic view of a configuration of microphone unit 700 not having a dummy component. Microphone unit 700 includes casing 610, the first substrate 620, the second substrate 630, vibrating unit 230, diaphragm 232, and ASIC 240. Openings 130, 132 are provided in casing 610.

Since microphone unit 700 does not have a dummy component inside casing 610, internal space 410 through which a sound entering from opening 130 propagates has a volume larger than the volume of internal space 640 of microphone unit 600 provided with dummy component 300. Thus, a resonance frequency in microphone unit 700 is lower than a resonance frequency in microphone unit 600 of FIG. 6.

However, according to microphone unit 600 in accordance with the present embodiment, since a volume portion of a space is reduced by dummy component 300, the resonance frequency becomes higher. As a result, acoustic characteristics necessary for a mobile phone can be ensured.

In addition, fine adjustment for changing the size of the dummy component in accordance with sensitivity in internal space 640 and obtaining high-quality differential characteristics can be performed.

<First Variation>

Figure 8:
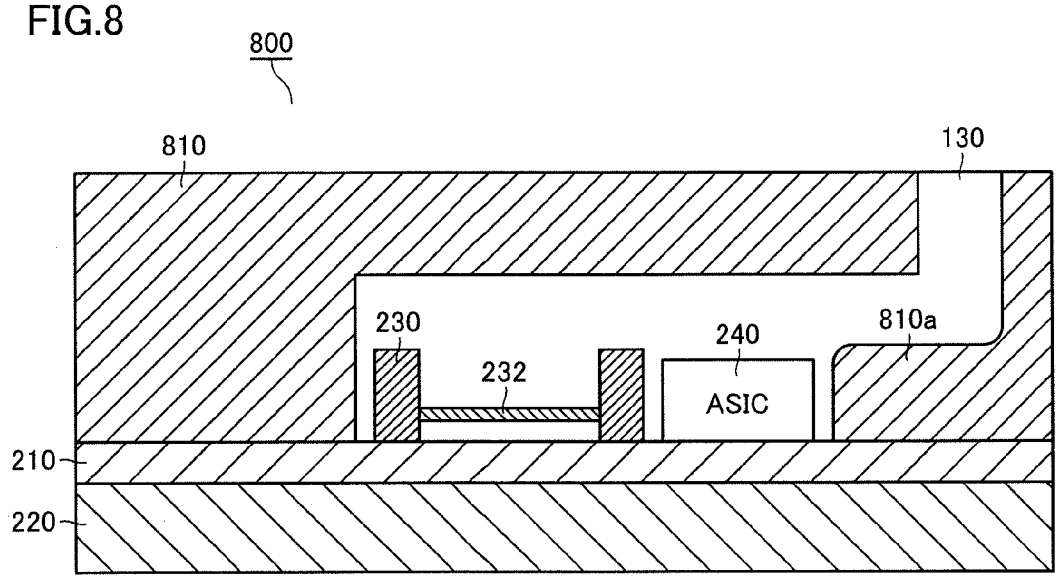
FIG. 8 is a schematic view of a cross sectional configuration of a microphone unit 800 in accordance with a first variation of the embodiment.

Referring to FIG. 8, a first variation of the present embodiment will be described. FIG. 8 is a schematic view of a cross sectional configuration of a microphone unit 800 in accordance with the present variation. Microphone unit 800 includes a casing 810, the first substrate 210, the second substrate 220, vibrating unit 230, diaphragm 232, and ASIC 240. In a configuration of casing 810, a protruding portion 810a is formed on a surface below opening 130. A sound entering from opening 130 passes through an internal space 820, and vibrates diaphragm 232.

Protruding portion 810a is formed, for example, by injection-molding casing 810. Such a protruding portion 810a reduces the volume of the internal space of casing 810 as with dummy component 300 described above. Therefore, microphone unit 800 has a resonance frequency higher than the resonance frequency in microphone unit 400 not having protruding portion 810a (FIG. 4). As a result, acoustic characteristics of the mobile phone are improved.

<Second Variation>

Figure 9:
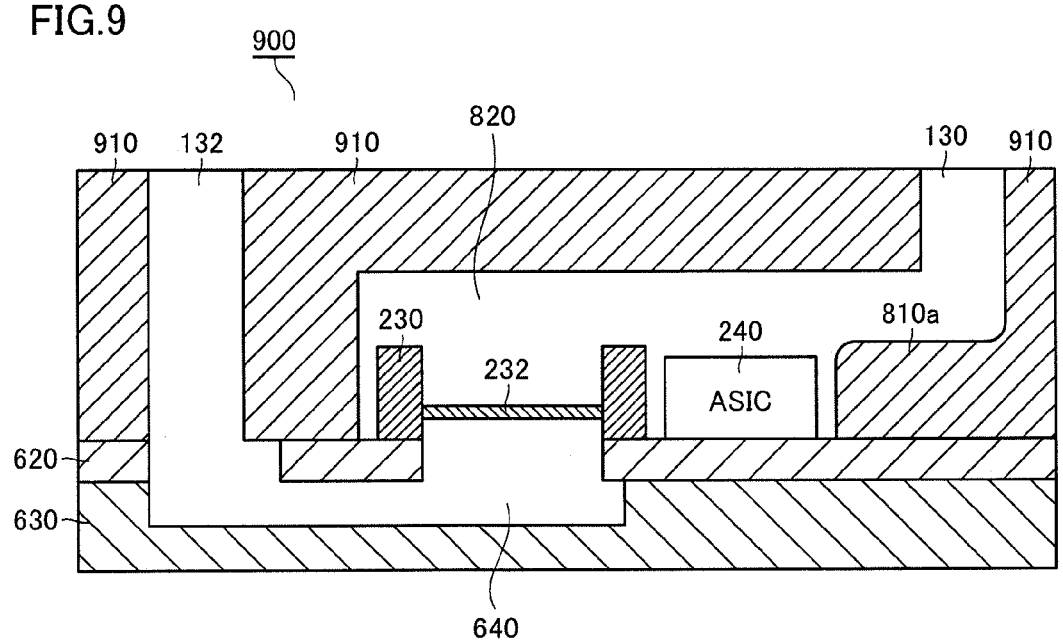
FIG. 9 is a schematic view of a cross sectional configuration of a microphone unit 900 in accordance with a second variation of the embodiment.

Referring to FIG. 9, a second variation of the present embodiment will be described. FIG. 9 is a schematic view of a cross sectional configuration of a microphone unit 900 in accordance with the present variation. Microphone unit 900 includes a casing 910, the first substrate 620, the second substrate 630, vibrating unit 230, diaphragm 232, and ASIC 240.

In casing 910, protruding portion 810a is formed below opening 130. Microphone unit 900 is a so-called differential microphone. Therefore, a sound entering from opening 130 passes through internal space 820 having a volume reduced by protruding portion 810a, and vibrates diaphragm 232 from the upper surface of diaphragm 232. On the other hand, a sound entering from opening 132 passes through a transmission path formed between the first substrate 620 and the second substrate 630, and vibrates diaphragm 232 from the lower surface of diaphragm 232. With this configuration, a transmission path for the sound entering from opening 130 has a volume smaller than that in a case where protruding portion 810a is not provided, and thus a reduction in the resonance frequency can be prevented, and acoustic characteristics of a mobile phone mounted with microphone unit 900 can be improved. In this case, it is desirable that internal space 820 has a volume substantially identical to the volume of internal space 640. With such a configuration, microphone unit 900 can cancel noises as a differential microphone.

Concerning the first variation and the second variation, since it is difficult to form a lateral acoustic path inside casing 810, the casing of the microphone unit is generally produced by bonding two or more members subjected to a hole drilling process beforehand. However, according to the configuration in which dummy component 300 is arranged as in microphone unit 800 in accordance with the first variation or microphone unit 900 in accordance with the second variation, casing 810 can be formed by processing a single member, and thus casing 810 can be readily processed, and the effects of a reduction in the number of steps and a reduction in cost can be obtained.

[Effects of Embodiments]

As has been described in detail, according to the microphone unit in accordance with each embodiment or its variation, the volume of the internal space of the casing is reduced by dummy component 300 or protruding portion 810a provided in the internal space. As a result, the resonance frequency shifts to a high range, and a range having flat frequency characteristics is increased. Thereby, acoustic characteristics of equipment provided with the microphone unit (for example, a mobile phone, a voice recorder, and the like) can be improved.

Although the embodiments of the present invention have been described and illustrated in detail, it is clearly understood that the same is by way of illustration and example only and is not to be taken by way of limitation, the scope of the present invention being interpreted by the terms of the appended claims Description of the Reference Signs 100: mobile phone, 110: system board, 120, 400, 600, 700, 800, 900: microphone unit, 130, 132: opening, 200, 810: casing, 210, 620: the first substrate, 220, 630: the second substrate, 230: vibrating unit, 232: diaphragm, 240: ASIC, 300: dummy component, 310, 410, 640: internal space, 810a: protruding portion.

The invention claimed is:

1. A microphone unit, comprising:
   a casing having an internal space and a first opening, a portion of said casing including a substrate portion facing said internal space;
   a vibrating portion mounted on said substrate portion facing said internal space to convert acoustic vibration into an electric signal; and
   an acoustic correction member mounted on said substrate portion facing said internal space to correct characteristics of acoustic transmission from said first opening to said vibrating portion.

2. The microphone unit according to claim 1, wherein
   said internal space includes a first partial space and a second partial space,
   said vibrating portion is arranged between the first partial space and the second partial space,
   a second opening connected to the second partial space is further formed in said casing portion,
   said first opening is connected to said first partial space, and
   said acoustic correction member is placed in at least one of said first partial space and said second partial space.

3. The microphone unit according to claim 2, wherein said acoustic correction member is formed such that an air volume of the first partial space is equal to an air volume of the second partial space.

4. The microphone unit according to claim 2, wherein said acoustic correction member has a shape formed such that an acoustic impedance from said first opening to said vibrating portion is equal to an acoustic impedance from said second opening to said vibrating portion.

5. The microphone unit according to claim 1, wherein said vibrating portion is arranged to be offset from a central axis of said first opening.

6. The microphone unit according to claim 1, wherein said acoustic correction member is arranged below said first opening.

7. The microphone unit according to claim 1, wherein said acoustic correction member is an insulator.

8. The microphone unit according to claim 1, wherein said acoustic correction member is formed of a conductive material and fixed to a ground potential.

9. The microphone unit according to claim 1, wherein said acoustic correction member is fitted in said casing.

10. The microphone unit according to claim 1, further comprising a substrate, wherein said acoustic correction member is solder-bonded to said substrate.

11. A mobile phone provided with the microphone unit according to claim 1.

12. The microphone unit according to claim 1, wherein the vibrating portion is a diaphragm.

* * * * *